United States Patent
Song et al.

(10) Patent No.: US 12,148,913 B2
(45) Date of Patent: Nov. 19, 2024

(54) METHOD OF MANUFACTURING AN ELECTRODE FOR AN ALL-SOLID-STATE BATTERY AND AN ELECTRODE FOR AN ALL-SOLID-STATE BATTERY MANUFACTURED THEREBY

(71) Applicants: HYUNDAI MOTOR COMPANY, Seoul (KR); KIA CORPORATION, Seoul (KR)

(72) Inventors: Kyung Yup Song, Yongin-si (KR); Dae Yang Oh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 228 days.

(21) Appl. No.: 17/509,894

(22) Filed: Oct. 25, 2021

(65) Prior Publication Data
US 2022/0285662 A1   Sep. 8, 2022

(30) Foreign Application Priority Data
Mar. 8, 2021   (KR) .................. 10-2021-0029830

(51) Int. Cl.
*H01M 4/04*   (2006.01)
*H01M 4/139*   (2010.01)
*H01M 10/052*   (2010.01)
*H01M 10/0585*   (2010.01)

(52) U.S. Cl.
CPC ......... *H01M 4/0435* (2013.01); *H01M 4/139* (2013.01); *H01M 10/052* (2013.01); *H01M 10/0585* (2013.01)

(58) Field of Classification Search
CPC .. H01M 4/0435; H01M 4/139; H01M 10/052; H01M 10/0585; H01M 4/8896; B30B 3/005; B30B 3/04; B30B 11/165
USPC ........................................ 429/209
See application file for complete search history.

(56) References Cited

U.S. PATENT DOCUMENTS

| | | | |
|---|---|---|---|
| 10,818,963 B2 | 10/2020 | Makino et al. | |
| 2006/0137157 A1* | 6/2006 | Itagawa | H01M 10/128 29/2 |
| 2010/0003599 A1* | 1/2010 | Nonoshita | H01M 4/661 204/192.15 |

(Continued)

FOREIGN PATENT DOCUMENTS

| | | | | |
|---|---|---|---|---|
| JP | H11176473 A | * | 7/1999 | ............ H01M 10/05 |
| KR | 102019585 B1 | | 9/2019 | |
| WO | WO-2020203997 A1 | * | 10/2020 | ........ H01M 10/0525 |

*Primary Examiner* — Pamela H Weiss
*Assistant Examiner* — John S Medley
(74) *Attorney, Agent, or Firm* — Lempia Summerfield Katz LLC

(57) ABSTRACT

A method of manufacturing an electrode for an all-solid-state battery is performed in a dry manner using first and second rollers. An electrode for an all-solid-state battery having an electrode layer with a desired thickness and a desired density of a mixture material may be manufactured by adjusting conditions of the first and the second rollers. The manufacturing speed may be accelerated, because there is no drying process, so that the efficiency of the manufacturing is improved. The process of thickening an electrode is realized by using the method and the porosity of the electrode for an all-solid-state battery manufactured thereby is excellent.

7 Claims, 5 Drawing Sheets

(56) References Cited

U.S. PATENT DOCUMENTS

| | | | |
|---|---|---|---|
| 2014/0342225 A1* | 11/2014 | Isshiki | H01M 4/366 |
| | | | 429/217 |
| 2017/0256781 A1* | 9/2017 | Suzuki | H01M 4/139 |
| 2017/0279113 A1* | 9/2017 | Ohsawa | H01M 50/44 |
| 2018/0083307 A1 | 3/2018 | Makino et al. | |
| 2019/0036104 A1* | 1/2019 | Hirukawa | H01M 4/0435 |
| 2019/0165358 A1* | 5/2019 | Haga | H01M 10/052 |
| 2020/0067068 A1* | 2/2020 | Lee | H01M 10/0585 |
| 2020/0112053 A1* | 4/2020 | Mo | H01M 4/13 |
| 2021/0336242 A1* | 10/2021 | Kishimoto | H01M 4/0435 |
| 2022/0166020 A1* | 5/2022 | Yonemaru | H01M 50/409 |

* cited by examiner

METHOD OF MANUFACTURING AN ELECTRODE FOR AN ALL-SOLID-STATE BATTERY AND AN ELECTRODE FOR AN ALL-SOLID-STATE BATTERY MANUFACTURED THEREBY

CROSS REFERENCE TO RELATED APPLICATION

The present application claims priority to Korean Patent Application No. 10-2021-0029830, filed Mar. 8, 2021, the entire contents of which are incorporated herein for all purposes by this reference.

BACKGROUND

Field of the Disclosure

The present disclosure relates to a method of manufacturing an electrode for an all-solid-state battery in a dry manner and relates to an electrode for an all-solid-state battery manufactured thereby.

Description of the Related Art

With higher demands for electric vehicles and high capacity power storage devices, various batteries have been developed to satisfy the demands.

Among such batteries, lithium secondary batteries have been widely commercialized because the lithium secondary batteries have the most excellent energy density and power output characteristics among various secondary batteries. Among the lithium secondary batteries, a lithium secondary battery having a liquid type electrolyte including an organic solvent (hereinafter, referred to as a liquid type secondary battery) have been generally used.

However, in the liquid type secondary battery, the liquid electrolyte causes expansion of the battery when the liquid electrolyte is decomposed by the electrode reaction. There is a risk of ignition due to a leakage of the liquid electrolyte. To solve the problems of the liquid type secondary battery, attention is now focusing on a lithium secondary battery having a solid type electrolyte having excellent stability (hereinafter, referred to as an all-solid-state battery).

Meanwhile, most of the electrodes for all-solid-state batteries included in the all-solid-state battery are manufactured by processing in a wet manner. In such a manner, an electrode slurry is manufactured and then the electrode slurry is coated on a current collector or the like and then dried.

However, the electrode manufactured by processing in the wet manner has problems in that when a process of thickening the electrode is performed, the electrode being manufactured thereby may not be uniformly produced and the cost of the manufacturing process is high.

SUMMARY

Accordingly, the present disclosure has been made keeping in mind the above problems occurring in the related art. The present disclosure provides a method of manufacturing an electrode for an all-solid-state battery in a dry manner by using first and second rollers having different sizes to each other. The first and second rollers are adjusted to satisfy specific conditions.

In addition, another objective of the present disclosure is to provide an electrode for an all-solid-state battery manufactured by the method. The electrode includes a current collecting layer and an electrode layer positioned on the current collecting layer.

The objectives of the present disclosure should be clearly understood from the following description and can be implemented by the means defined in the claims and combinations thereof, but the objectives of the present disclosure are not limited thereto.

One aspect of the present disclosure provides a method of manufacturing an electrode for an all-solid-state battery. The method includes: preparing a mixture for an electrode, the mixture including a solid electrolyte and an active material; manufacturing an electrode sheet by compressing the mixture for an electrode with at least one pair of first rollers; manufacturing a composite sheet by providing a current collector sheet on the electrode sheet; and obtaining an electrode for an all-solid-state battery by compressing the composite sheet with at least one pair of second rollers. A diameter of each of the second rollers is 4 to 10 times larger than a diameter of each of the first rollers. The electrode for an all-solid-state battery includes a current collecting layer and an electrode layer positioned on the current collecting layer.

The diameter of each of the first rollers may be 1 cm to 5 cm.

The number of the first rollers may be 1 to 7 pairs.

A rolling rate of one the pairs of first rollers may be 10% to 30%.

A distance between the pairs of first rollers may be 10 cm or less.

A thickness ratio of the electrode sheet may be 120% to 130% when a thickness of the electrode layer in the electrode for an all-solid-state battery is set to 100%.

A thickness of the electrode sheet may be 150 μm to 500 μm.

The diameter of each of the second rollers may be 4 cm to 50 cm.

A rolling rate of the second rollers may be 15% to 30%.

The number of the second rollers may be 1 to 2 pairs.

A temperature of each of the first rollers and each of the second rollers may be 150° C. or less.

One aspect of the present disclosure provides an electrode for an all-solid-state battery manufactured according to the method. The electrode including a current collecting layer and an electrode layer positioned on the current collecting layer.

A thickness of the electrode layer may be 200 μm to 400 μm.

A porosity in the electrode layer is 75% to 95%.

The method of manufacturing an electrode for an all-solid-state battery according to the present disclosure is performed in a dry manner, which is different from a conventional method that is performed in a wet manner. Thus, an electrode for an all-solid-state battery having an electrode layer with a desired thickness and a desired density of mixture material may be manufactured by adjusting the conditions of the first and the second rollers. In addition, the manufacturing speed may be accelerated, because there is no drying process, so that the efficiency of manufacturing is excellent.

In addition, in the method of manufacturing the electrode for an all-solid-state battery according to the present disclosure, a situation such as swelling of a binder and so on do not occur, which is different from a conventional method that is performed in the wet manner, so that uniform thickness of the electrode may be realized.

In addition, the electrode for an all-solid-state battery manufactured thereby may have an excellent porosity by adjusting the conditions of the second rollers.

The effects of the present disclosure are not limited to the aforementioned effects. The effects of the present disclosure are to be understood to include all the effects capable of being inferred from the following explanation.

DESCRIPTION OF THE EMBODIMENTS

Figure 1:
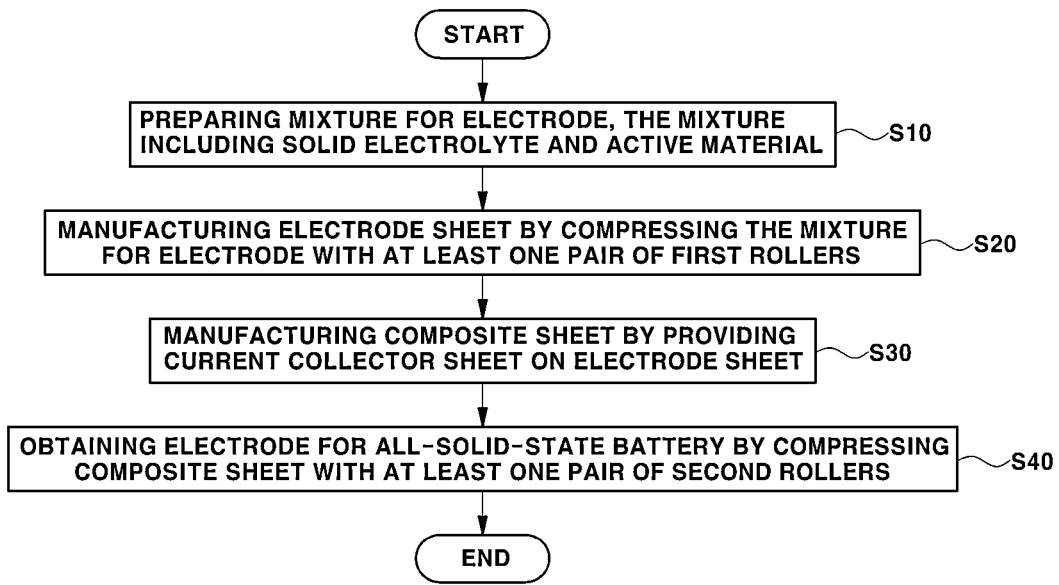
FIG. 1 is a flowchart schematically illustrating a method of manufacturing an electrode for an all-solid-state battery according to an embodiment of the present disclosure.

The objectives, features, and advantages of the present disclosure should be easily understood through the following detailed description of specific embodiments and the attached drawings. However, the present disclosure is not limited to the embodiments and may be embodied in other forms. On the contrary, the embodiments are provided so that the disclosure of the present disclosure may be completely and fully understood by those of ordinary skill in the art.

In the attached drawings, like numerals are used to represent like elements. In the drawings, the dimensions of the elements are enlarged for easier understanding of the present disclosure. Although the terms "first", "second", etc. may be used to describe various elements, these elements should not be limited by the terms. The terms are used only to distinguish one element from another. For example, a first element can be termed a second element and, similarly, a second element can be termed a first element without departing from the scope of the present disclosure. A singular expression includes a plural expression unless the context clearly indicates otherwise.

In the present disclosure, terms such as "include", "contain", "have", etc. should be understood as designating that features, numbers, steps, operations, elements, parts or combinations thereof exist. These terms should not be understood as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the other element or an intervening element may also be present. Likewise, when an element such as a layer, a film, a region, a substrate, etc. is referred to as being "under" another element, it can be "directly under" the other element or an intervening element may also be present.

Unless specified otherwise, all the numbers, values, and/or expressions representing the amount of components, reaction conditions, polymer compositions, or mixtures are approximations reflecting various uncertainties of measurement occurring in obtaining those values and should be understood to be modified by "about". Also, unless specified otherwise, all the numerical ranges disclosed in the present disclosure are continuous and include all the values from the minimum values to the maximum values included in the ranges. In addition, when the ranges indicate integers, all the integers from the minimum values to the maximum values included in the ranges are included unless specified otherwise.

The ranges of variables described in the present disclosure are to be understood to include all the values within the specified end points of the ranges. For example, a range of "5-10" should be understood to include not only the values 5, 6, 7, 8, 9 and 10, but also any values within subranges such as 6-10, 7-10, 6-9, 7-9, etc. and to include any values between appropriate integers in the specified ranges such as 5.5, 6.5, 7.5, 5.5-8.5, 6.5-9, etc. In addition, for example, a range of "10-30%" should be understood to include not only the integers 10%, 11%, 12%, 13%, . . . , 30%, but also any values within subranges such as 10%-15%, 12%-18%, 20%-30%, etc. and to include any values between appropriate integers in the specified ranges such as 10.5%, 15.5%, 25.5%, etc. When a component, device, element, or the like of the present disclosure is described as having a purpose or performing an operation, function, or the like, the component, device, or element should be considered herein as being "configured to" meet that purpose or to perform that operation or function.

A conventional wet process for manufacturing an electrode for an all-solid-state battery has problems in that when a process of thickening the electrode is performed, the electrode manufactured thereby is not uniformly produced and the cost of the manufacturing process is high.

As a result of intensive studies, the present inventors have found that when the numbers of, diameters of, and so on of first and second rollers having different sizes are adjusted to satisfy specific conditions and the manufacturing of an electrode for an all-solid-state battery in a dry manner is performed, swelling of a binder does not occur. Thus, the process of uniformly thickening the electrode is possible and process efficiency becomes increased because the manufacturing process may be simplified, and a manufacturing cost is decreased.

FIG. 1 is a flowchart schematically illustrating a method of manufacturing an electrode for an all-solid-state battery according to an embodiment of the present disclosure. Referring to FIG. 1, the method includes preparing a mixture for an electrode. The mixture includes a solid electrolyte and an active material S10. The method includes manufacturing an electrode sheet by compressing the mixture for an electrode with at least one pair of first rollers S20. The method includes manufacturing a composite sheet by providing a current collector sheet on the electrode sheet S30. The method includes obtaining an electrode for all-solid-state battery by compressing the composite sheet with at least one pair of second rollers S40. At this time, a diameter of each of the second rollers is 4 to 10 times larger than a diameter of each of the first rollers. The electrode for an all-solid-state battery manufactured by the above discussed method includes a current collecting layer and an electrode layer positioned on the current collecting layer.

The preparing of a mixture for an electrode S10 is a process of preparing a powder or a clay type mixture for an electrode by mixing a solid electrolyte, an active material, and so on, with a mixer.

The active material is a conventional active material, which may be used in the present disclosure, and the active material may be changed depending on a polarity. For example, in an anode active material, a carbon material such as natural graphite, artificial graphite, graphite carbon fiber, resin sintered carbon, or an alloy material, which is compounded with a solid electrolyte may be used. Examples of the alloy material may include lithium alloys such as LiAl, LiZn, Li$_3$Bi, Li$_3$Cd, Li$_3$Sb, Li$_4$Si, Li$_{4.4}$Pb, Li$_{4.4}$Sn, Li$_{0.17}$C, and LiC$_6$, or metal oxides such as lithium titanate (Li$_4$Ti$_5$O$_{12}$) and Zn. In addition, in a cathode active material, an oxide active material or a sulfide active material may be used. For example, the oxide active material may be a rock-salt-layer-type active material such as LiCoO$_2$, LiMnO$_2$, LiNiO$_2$, LiVO$_2$, Li$_{1+x}$Ni$_{1/3}$Co$_{1/3}$Mn$_{1/3}$O$_2$, and the like; a spinel-type active material such as LiMn$_2$O$_4$, Li(Ni$_{0.5}$Mn$_{1.5}$)O$_4$, and the like. The oxide active material may be an inverse-spinel-type active material such as LiNiVO$_4$, LiCoVO$_4$, and the like. The oxide active material may be an olivine-type active material such as LiFePO$_4$, LiMnPO$_4$, LiCoPO$_4$, LiNiPO$_4$, and the like. The oxide active material may be a silicon-containing active material such as Li$_2$FeSiO$_4$, Li$_2$MnSiO$_4$, and the like. The oxide active material may be a rock-solid-layer-type active material in which a portion of a transition metal is substituted with a different metal, such as LiNi$_{0.8}$Co$_{(0.2-x)}$Al$_x$O$_2$ (0<x<2). The oxide active material may be a spinel-type active material in which a portion of a transition metal is substituted with a different metal, such as Li$_{1+x}$Mn$_{2-x-y}$M$_y$O$_4$ (M being at least one of Al, Mg, Co, Fe, Ni and Zn, 0<x+y<2. The oxide active material may be lithium titanate such as Li$_4$Ti$_5$O$_{12}$ and the like. The sulfide active material may be copper Chevrel, iron sulfide, cobalt sulfide, nickel sulfide, etc.

The solid electrolyte is a component configured to conduct lithium ion and may be an oxide-based solid electrolyte or a sulfide-based solid electrolyte. However, the sulfide-based solid electrolyte with high lithium ion conductivity may also be used.

Specifically, the solid electrolyte may be a solid electrolyte according to Chemical Formula 1 described below.

$$L_aM_bP_cS_dX_e \qquad \text{[Chemical Formula 1]}$$

(Chemical Formula 1, wherein the L is at least one element selected from the group consisting of alkali metal; M is at least one element selected from the group consisting of B, Al, Ga, In, Si, Ge, Sn, Pb, As, Sb, Bi, Ti, V, Mn, Fe, Co, Ni, Cu, Y, Zr, Nb, Mo, Tc, Ru, Rh, Pd, Ag, Hf, Ta, or W; X is at least one element selected from the group consisting of F, Cl, Br, I, or O; and where 0≤a≤12, 0≤b≤6, 0≤c≤6, 0≤d≤12, and 0≤e≤9)

In an embodiment, the solid electrolyte according to Chemical Formula 1 may be Li$_6$PS$_5$Cl, Li$_2$S—P$_2$S$_5$, Li$_2$S—P$_2$S$_5$—LiI, Li$_2$S—P$_2$S$_5$—LiCl, Li$_2$S—P$_2$S$_5$—LiBr, Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$ (in which m and n are positive numbers, and Z is any one of Ge, Zn, and Ga), Li$_2$S—GeS$_2$, Li$_2$S—SiS$_2$—Li$_3$PO$_4$, Li$_2$S—SiS$_2$—Li$_x$MO$_y$ (in which x and y are positive numbers, and M is any one of P, Si, Ge, B, Al, Ga, and/or In), Li$_{10}$GeP$_2$S$_{12}$, etc.

In addition, for increasing an electrical conductivity, the mixture for an electrode may further include a conductive material. In an embodiment, the conductive material may be carbon black, conducting graphite, ethylene black, graphene, etc.

Figure 2:
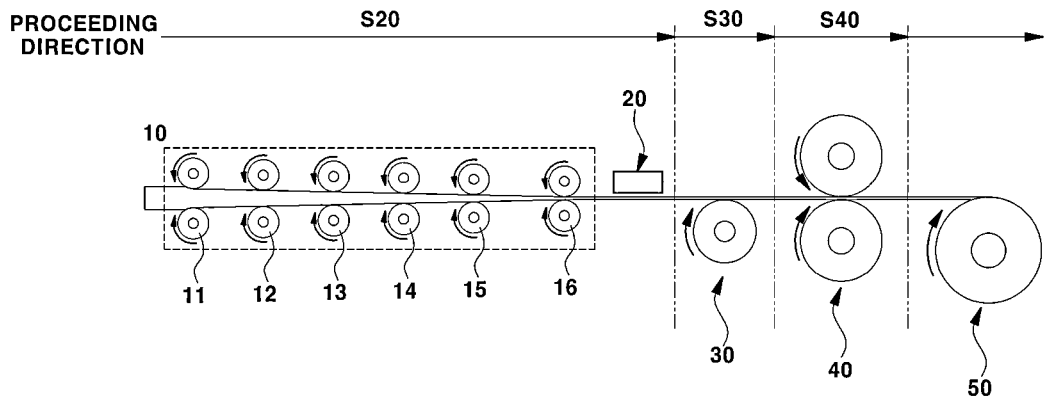
FIG. 2 is a side view schematically illustrating the method of manufacturing an electrode for an all-solid-state battery according to an embodiment of the present disclosure along a manufacturing direction.

FIG. 2 is a side view schematically illustrating the method of manufacturing an electrode for an all-solid-state battery according to an embodiment of the present disclosure along a manufacturing direction. The manufacturing process is described with reference to FIG. 2.

Referring to FIG. 2, manufacturing an electrode sheet S20 is a process in which the powder or clay type mixture for an electrode is compressed with at least one pair of the first rollers 10 to form an electrode sheet.

The first roller may be provided to be a pair of the first rollers 10 positioned in a direction facing each other at a predetermined distance with respect to the provided mixture for an electrode.

Six pairs of the first rollers may be spaced apart from each other at predetermined intervals. However, FIG. 2 merely shows an embodiment of the present disclosure, so that the number of the first rollers is not limited to the six pairs. The number of the first rollers may be variously changed depending on an amount of the mixture for an electrode initially fed, depending on a target thickness of the electrode layer thickness of a final electrode for an all-solid-state battery, depending on a target density of the mixture material of the electrode layer, and the like. In an embodiment, the number of the first rollers may be 1 pair to 7 pairs. When the number of the first rollers is too small and out of the above-mentioned range, the process of sheeting the electrode may not be sufficiently performed. When the number of the first rollers is too large and out of the above-mentioned range, the size of manufacturing facility and the manufacturing time may increase.

The diameter of each of the first rollers may vary depending on the amount of the mixture for an electrode initially fed, depending on the target thickness of the electrode layer thickness of the final electrode for an all-solid-state battery, depending on the target density of the mixture material of the electrode layer, and the like. In an embodiment, the diameter of each of the first rollers may be smaller than the diameter of each of the second rollers. In another embodiment, the diameter of each of the first rollers may be ¼ to ¹⁄₁₀ times smaller than the diameter of each of the second rollers.

According to the present disclosure, when the diameter of each of the first rollers is smaller than the diameter of each of the second rollers, in accordance with Equation 1 below, a rolling force applied by the pair of first rollers to the mixture for an electrode decreases. When the rolling force is decreased, the contact length with the mixture for an electrode according to the diameter of each of the first rollers L decreases, so that stretching of the mixture for an electrode is facilitated. Thereby, the mixture for an electrode in sheet types is easily manufactured.

$$\text{Rolling force}(\Delta h)=h_0-h_f-\mu^2 R, \qquad \text{[Equation 1]}$$

$h_o$=thickness of mixture for electrode before rolling, $h_f$=thickness of mixture for electrode after rolling, μ=coefficient of friction, R=Radius of first roller

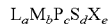

$$L=\sqrt{R\Delta h} \qquad \text{[Equation 2]}$$

Wherein L=contact length with mixture for electrode according to diameter of first roller, Δh=rolling force Accordingly, in an embodiment, the diameter of each of the first rollers according to the present disclosure may be 1 cm to 5 cm. In another embodiment, the diameter of each of the first rollers according to the present disclosure may be 1 cm to 3 cm. When the diameter of each of the first rollers is too small and out of the above-mentioned range, the rolling force is significantly decreased, so that the sheeting of the electrode may not be sufficiently performed. When the diameter of each of the first rollers is too large and out of the above-mentioned range, the electrode is vertically compressed, so that manufacturing the electrode having a small thickness may be difficult. Also, a density of the electrode may become too high, so that adhesion between the electrode and the current collector by using the second rollers, which is post-processing, may be difficult to be performed.

The interval between the pairs of first rollers may be relatively close for efficient installation of the manufacturing facility. In an embodiment, the pairs of first rollers may be positioned to be spaced apart from each other at an interval of 10 cm or less. In another embodiment, the pairs of first rollers may be positioned to be spaced apart from each other at an interval of 1 cm to 7 cm. When the interval between the pairs of first rollers is 10 cm or more and out of the above-mentioned range, there is a disadvantage in that the size of the manufacturing facility becomes large and also the manufacturing time increases.

The rolling ratio of the first roller may be an amount in change of the thickness of the electrode after compressed by the pair of first rollers and may be controlled by adjusting a distance between the pair of the first rollers.

Specifically, as shown in FIG. 2, the distance between the pair of primary first rollers 11 may be controlled so as to achieve 10% to 30% changes in the thickness of the mixture for an electrode after being compressed by the primary first rollers 11, compared to an initial thickness of the mixture for an electrode. The mixture is in the form of clay or the like and is fed into the primary first rollers. Then, the distance between a pair of secondary first rollers 12 may be controlled so as to achieve 10% to 30% changes in the thickness of the mixture for an electrode after being compressed by the secondary first rollers 12, compared to the thickness of the mixture for an electrode after being compressed by the primary first rollers 11. Then, the distance between a pair of tertiary first rollers 13 may be controlled so as to achieve 10% to 30% changes in the thickness of the mixture for an electrode after being compressed by the tertiary first rollers 13, compared to the thickness of the mixture for an electrode after being compressed by the secondary first rollers 12. As such, in order to achieve the rolling ratio of the first rollers to a desired value when the mixture for an electrode is moved, the distance between the pairs of first rollers may be gradually reduced so as to match the desired value of the rolling ratio, so that the mixture for an electrode may be manufactured to the electrode sheet.

Accordingly, the rolling ratio of the first rollers may be 10% to 35% or may be 15% to 30%. When the rolling rate of the first rollers is too low and out of the above-mentioned range, there is a disadvantage that the size of the manufacturing facility becomes large and also manufacturing time increases since more rollers need to be installed to roll to the target thickness of the electrode. When the rolling ratio of the first rollers is too high and out of the above-mentioned range, there is a disadvantage in that the electrode may not be discharged through between the rollers and a defect such as a lateral tearing and bursting of the central portion of the electrode may occur.

In other words, depending on a state such as the thickness and so on of the initially fed mixture for an electrode being in the form of clay or the like, the conditions of the first rollers such as the diameter of each of the first rollers, the number of the first rollers, the distance between the first rollers, the rolling ratio of the pair of first rollers, and so on may be controlled to manufacture the electrode sheet.

In an embodiment, the electrode sheet may be manufactured by controlling the condition such that a thickness ratio of the electrode sheet is to be 120% to 130% when the target thickness of the electrode layer in the electrode for an all-solid-state battery is set to 100%. When the thickness ratio of the electrode sheet is too low and out of the above-mentioned range, there is a disadvantage in that it is not efficient to roll the electrode. When the thickness ratio of the electrode sheet is too high and out of the above-mentioned range, it is difficult to roll the electrode to the final thickness by the second roller, which is a post-process, or there is a disadvantage that the electrode has a very high brittleness even if the electrode is rolled.

In addition, in an embodiment, the thickness of the electrode sheet satisfies the above-mentioned range and also may be in the range of 150 μm to 500 μm. In another embodiment, the thickness of the electrode sheet is in the range of 200 μm to 400 μm. When the thickness of the electrode is too thin and out of the above-mentioned range, there is a problem that it is difficult to perform the thickening of the electrode and there is a problem that it is difficult to express all the capacities of the electrode.

Referring to FIG. 2, the fed mixture for an electrode is compressed by the plurality of first rollers along the manufacturing direction. After the electrode sheet is manufactured by being compressed with the first rollers, the electrode sheet is cut by passing along an edge cutter 20 before when the current collector is provided on the electrode sheet, so that the electrode sheet having uniform size may be manufactured.

Referring to FIG. 2, manufacturing a composite sheet S30 is a process of manufacturing a composite sheet by providing a current collector sheet on any one surface of the electrode sheet through a current collector sheet roller 30.

The current collector sheet may contain different components depending on the polarity. For example, a positive electrode current collector sheet may be an aluminum foil, a stainless steel (SUS) foil, a primer-coated foil, a primer-treated foil, a punching foil, or the like. A negative electrode current collector sheet may be a copper foil, a nickel foil, or the like. The positive or negative electrode current collector sheets are not limited to the use of only specific foils.

Referring to FIG. 2, obtaining an electrode for an all-solid-state battery S40 is a process of obtaining an electrode for an all-solid-state battery by compressing the composite sheet having the current collector sheet provided on any one surface of the electrode sheet and the electrode sheet by using at least a pair of second rollers 40.

At this time, the distance between the second rollers 20 and the first rollers 10 is not specifically limited because a spring back situation does not occur at the electrode sheet manufactured by being compressed by the first rollers 10. In an embodiment, the distance between the second rollers 20 and the first rollers 10 is sufficient to ensure a distance to position the edge cutter 20 and the current collector sheet roller 30.

A pair of second rollers may be positioned to face each other and spaced apart at a predetermined distance with respect to the composite sheet that includes the fed electrode sheet and the current collector.

The second roller is provided as a pair, which can be positioned to be spaced apart at a predetermined distance from the current collector sheet roller 30. However, FIG. 2 illustrates an embodiment of the present disclosure and the number of the second rollers is not limited to one pair. The number the second rollers may be variously provided depending on a target thickness of the final electrode layer of the electrode for an all-solid-state battery with respect to the composite sheet including the fed electrode sheet and the current collector, depending on the target density of the mixture material of the electrode layer, and the like.

The diameter of the second rollers may be variously provided depending on the target thickness of the final electrode layer of the electrode for an all-solid-state battery with respect to the composite sheet including the fed electrode sheet and the current collector, depending on the target density of the mixture material of the electrode layer, and the like. In an embodiment, the diameter of each of the second rollers according to the present disclosure may be larger than the diameter of each of the first rollers. In another embodiment, the diameter of each of the second rollers may be 4 to 10 times larger than the diameter of each of the first rollers. When a magnification of radius of the second roller is smaller and out of the above-mentioned range, the electrode may not be compressed well, and the electrode is not compressed in a vertical direction but stretched in a horizontal direction. Thus, there is a disadvantage that a large number of pores may occur, the manufacturing facility becomes large, and the electrode may have high brittleness.

As such, when the diameter of each of the second rollers is larger than the diameter of each of the first rollers, a contact area between the second roller and the composite sheet is increased when the composite sheet is being rolled by the pair of second rollers in a vertical direction, so that a porosity of the electrode layer in the electrode for an all-solid-state battery finally manufactured is increased.

Therefore, in an embodiment, the diameter of each of the second rollers according to the present disclosure may be 4 cm to 50 cm. In another embodiment, the diameter of each of the second rollers according to the present disclosure may be 20 cm to 40 cm. When the diameter of each of the second rollers is too small, the electrode is not compressed in a vertical direction but is stretched in a horizontal direction, so that there is a disadvantage in that a larger number of pores may exist and the adhesive strength may be decreased. When the diameter of each of the second rollers is too large, the size of the manufacturing facility becomes large.

The meaning of the rolling ratio of the second rollers and the rolling ratio adjusting method may be the same as in the description for the first rollers.

Accordingly, the rolling ratio of the second rollers may be a rolling ratio that is to achieve the desired thickness of the electrode layer in the electrode for an all-solid-state battery compared to the thickness of the electrode sheet. In an embodiment, the rolling ratio of the second rollers may be 15% to 30%. When the rolling ratio of the second rollers is too low and out of the above-mentioned range, there is a problem in that the number of pores in the electrode increases and adhesion between the electrode and the current collector is not well formed. When the rolling ratio of the second rollers is too high and out of the above-mentioned range, there is a problem in that the electrode has very high brittleness, so that cracking or fracture of the electrode may occur.

In addition, the electrode for an all-solid-state battery may be manufactured by adjusting temperatures of the first and the second rollers depending on the type of the solid electrolyte included in the electrode sheet. In an embodiment, the temperatures of the first and the second rollers may be 150° C. or less. In another embodiment, the temperatures of the first and the second rollers may be 25° C. to 100° C. When the temperatures of the first and the second rollers are too high and out of the above-mentioned range, there is a disadvantage in that side reactions, particularly between the solid electrolyte and the mixture material constituting the electrode, may occur.

The electrode manufactured by being compressed by the second rollers may finally be wound by rewinding thereof with a rewind roller 50 as illustrated in FIG. 2 or may be directly manufactured to an all-solid-state battery stack by being notched to the electrode.

In other words, in the method of manufacturing an electrode for an all-solid-state battery according to the present disclosure, the mixture for an electrode is compressed by the first rollers that has relatively small diameter, so that the mixture for an electrode is stretched to have small thickness as much as possible and is manufactured to the electrode sheet. The mixture for an electrode is compressed by the second rollers, so that the electrode sheet and the current collector sheet are laminated, and the porosity of the electrode sheet increases and the porosity of the finally manufactured electrode layer of the electrode for an all-solid-state-battery is increased.

In addition, the method of manufacturing an electrode for an all-solid-state battery according to the present disclosure is performed in a dry manner, which is different from a conventional method that is performed in a wet manner, so that an electrode for an all-solid-state battery having an electrode layer with a desired thickness and a desired density of mixture material may be manufactured by adjusting the conditions of the first and the second rollers. In addition, the manufacturing speed may be accelerated, because there is no drying process, so that the efficiency of manufacturing is improved.

The electrode for an all-solid-state battery according to an embodiment of the present disclosure may be manufactured by a method satisfying the characteristics above and may include a current collecting layer and an electrode layer positioned on the current collecting layer.

In other words, according to the method of manufacturing an electrode for an all-solid-state battery, situations such as swelling of a binder and so on do not occur. Therefore, uniform thickening of the electrode may be realized, so that the thickness of the electrode layer may be thickened to 200 μm to 400 μm. Also, the porosity of the electrode layer may be increased to 75% to 95% by controlling the second rollers.

Hereinafter, the present disclosure is described more specifically through examples. However, these examples are provided only for understanding the present disclosure, and the scope of the present disclosure is not limited to these examples.

Example: Manufacturing of Electrode for all-Solid-State Battery According to Method of Present Disclosure Sulfide-based solid electrolyte as a solid electrolyte, nickel manganese cobalt oxide (NCM) as an active material, and carbon black as a conductive material were mixed. A clay type mixture for an all-solid-state battery was prepared by using a mortar S10.

The clay type mixture for an electrode was compressed by a rolling machine having a pair of first rollers each having a diameter of 3 cm and the clay type mixture for an electrode was manufactured to an electrode sheet S20.

Specifically, the diameter of the first roller was 3 cm and the rolling ratio of the first rollers for each pass was 20% (the rolling ratio of the first rollers is controlled by adjusting the distance between the one pair of first rollers).

Accordingly, the thickness of the electrode sheet manufactured was 330 μm, which is 127% of the final thickness of the electrode layer.

A composite sheet was manufactured by providing a sheet having carbon-coated aluminum as a current collector sheet to the electrode sheet S30.

An electrode for an all-solid-state battery finally including the current collecting layer and the electrode layer was manufactured by compressing the composite sheet with a pair of second rollers S40.

Specifically, the diameter of each of the second rollers was 30 cm and the rolling ratio of the second rollers for each pass was 21% (the rolling ratio of the second rollers is controlled by adjusting the distance between the one pair of second rollers).

Accordingly, the thickness of the electrode layer in the electrode for an all-solid-state battery, which was finally manufactured, was 260 μm.

Comparative Example 1: Manufacturing of Electrode for All-Solid-State Battery

An electrode for an all-solid-state battery was manufactured in the same manner as in the Example with exceptions. The exceptions include that the diameter of each of the first rollers was 3 cm, the rolling ratio of the first rollers was 25%, and the thickness of the electrode sheet was 720 μm, which is 138% of the thickness of the final electrode layer. The exceptions also include that the diameter of each of the second rollers was 30 cm, the rolling ratio of the second rollers was 28%, and the thickness of the electrode layer in the electrode for an all-solid-state battery was 520 μm.

Comparative Example 2: Manufacturing of Electrode for All-Solid-State Battery

An electrode for an all-solid-state battery was manufactured in the same manner as in the Example with exceptions. The exceptions include that the diameter of each of the first rollers was 3 cm, the rolling ratio of the first rollers was 25%, and the thickness of the electrode sheet was 470 μm, which is 134% of the thickness of the final electrode layer. The exceptions also include that the diameter of each of the second rollers was 30 cm, the rolling ratio of the second rollers was 25%, and the thickness of the electrode layer in the electrode for an all-solid-state battery was 350 μm.

Experimental Example 1: Analysis of Results After Compressing with First Rollers and Second Rollers Clay type mixtures for an electrode according to the Example were prepared and manufactured in sheet types. Then the sheet type mixtures were analyzed after being compressed by a pair of first rollers or a pair of second rollers, respectively. The results are shown in Table 1 and FIGS. 3A-4B.

TABLE 1

| Division | Mixture for Electrode (Sheet Type) | First Roller | Second Roller |
|---|---|---|---|
| Thickness | 330 μm | 330 μm −> 260 μm | 330 μm −> 260 μm |
| Rolling Ratio (Thickness Reduction Ratio) | — | 21% | 21% |
| Size Before Rolling | 2*2 cm | 2*2 cm | 2*2 cm |
| Size After Rolling | — | 2*2.7 cm | 2*2.1 cm |
| Strain Ratio | — | 135% | 105% |
| Mixture Material Loading | 70.8 mg/cm$^2$ | 54.9 mg/cm$^2$ | 67.8 mg/cm$^2$ |
| Bendability Test | — | Bent | Bent |

Figure 3A:
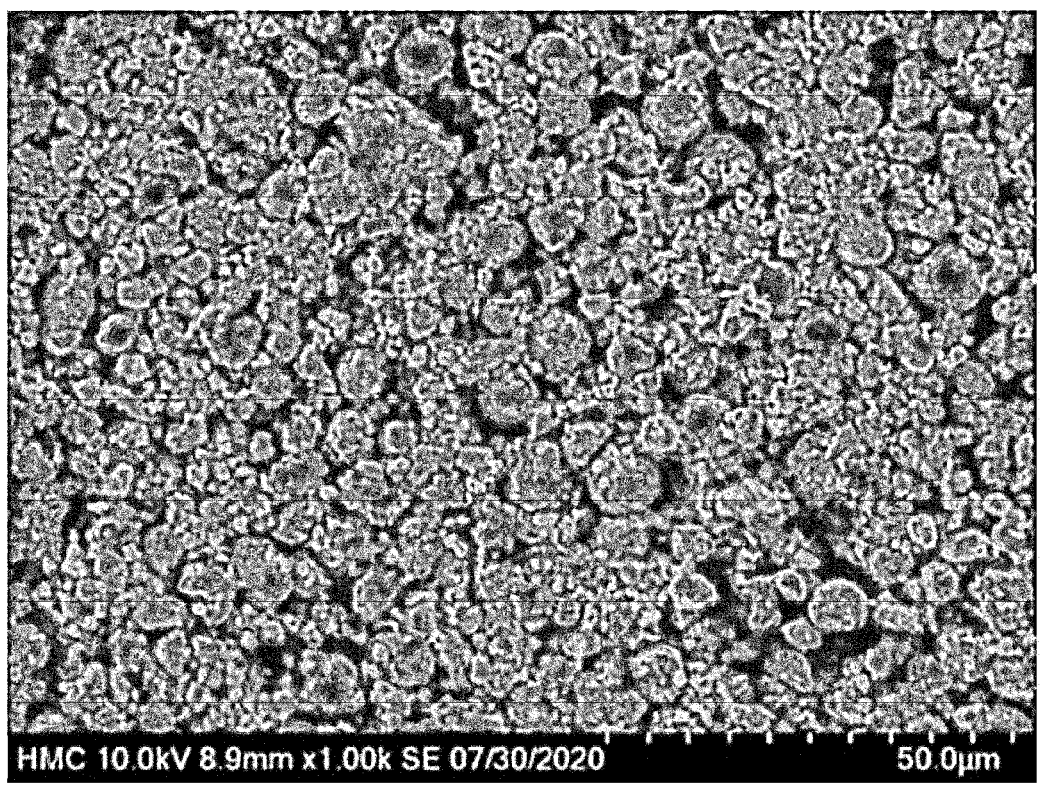
FIG. 3A is a scanning electron microscope (SEM) image showing a top surface of a mixture for an electrode (sheet) after compressing the sheet by a pair of first rollers.
Figure 3B:
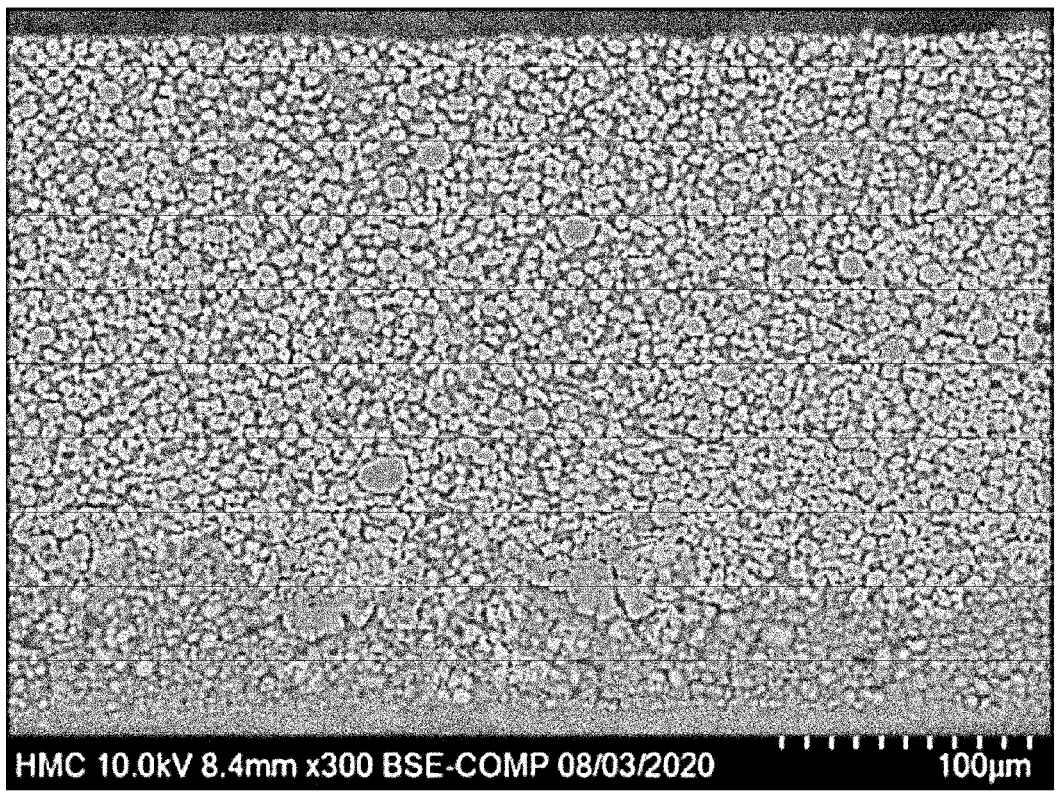
FIG. 3B is a SEM image showing a cross-section of the mixture for an electrode (sheet) after compressing the sheet by the pair of first rollers.
Figure 4A:
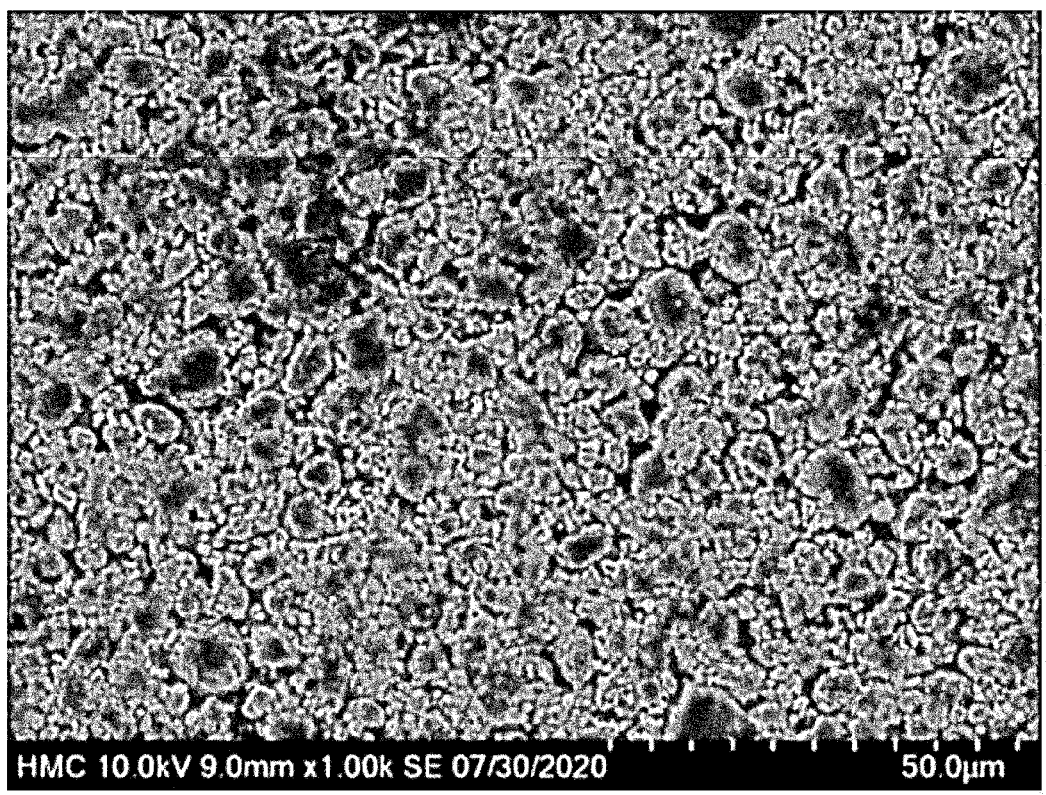
FIG. 4A is a SEM image showing a top surface of a mixture for an electrode (sheet) after compressing the sheet by a pair of second rollers.
Figure 4B:
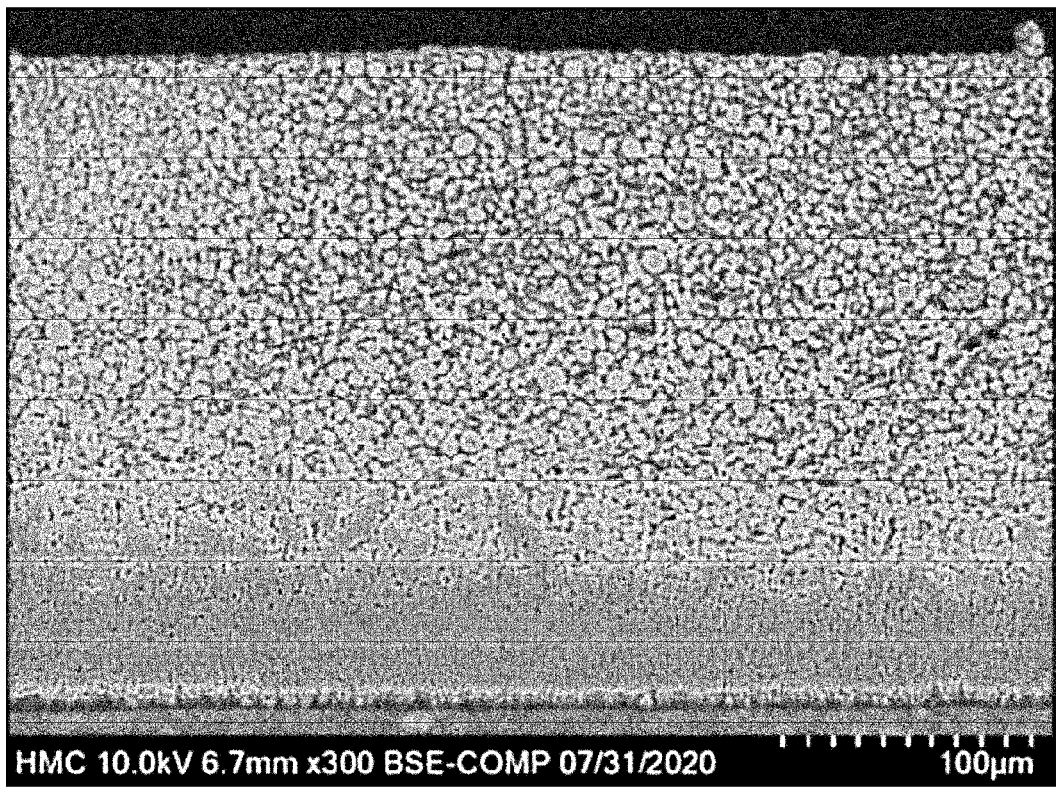
FIG. 4B is an SEM image showing a cross-section of the mixture for an electrode (sheet) after compressing the sheet by the pair of second rollers.

Referring to Table 1, the rolling ratio of each of the first and the second rollers was set to the same. When the mixtures for an electrode (sheet type) were compressed by each of the first and the second rollers, the strain ratio and an amount of the mixture material loading were compared. As a result, it was confirmed that the strain ratio caused by the first rollers is higher than that of the second rollers and the amount of the mixture material loading caused by the first rollers is lower than that of the second rollers. In other words, it was confirmed that the first rollers improve an elongation of the mixture for an electrode and thus facilitate the manufacturing of a sheet type mixture for an electrode. Meanwhile, since the amount of the mixture material loading caused by the second rollers was increased, it was confirmed that the amount of the mixture material loading of the electrode layer in the electrode for an all-solid-state battery may be controlled by adjusting conditions of the first and the second rollers. FIG. 3A is a scanning electron microscope (SEM) image showing a top surface of a mixture for an electrode (sheet type) after compressing the sheet by a pair of first rollers. FIG. 3B is an SEM image showing a cross-section of the mixture for an electrode (sheet type) after compressing the sheet by the pair of first rollers. In addition, FIG. 4A is an SEM image showing a top surface of a mixture for an electrode (sheet type) after compressing the sheet by a pair of second rollers. FIG. 4B is an SEM image showing a cross-section of the mixture for an electrode (sheet type) after compressing the sheet by the pair of second rollers.

Referring to FIGS. 3A-4B, it was confirmed that the sheet after compression with the second rollers had finer pores and higher porosity than the sheet after compression with the first rollers.

Accordingly, it was confirmed that the porosity in the electrode layer of the electrode for an all-solid-state battery may be controlled by adjusting the conditions of the second rollers.

Experimental Example 2: Comparing Physical Properties of Electrode for All-Solid-State Battery Electrodes for an all-solid-state battery were manufactured according to the Example, Comparative Example 1, and Comparative Example 2. The results were compared after the bendability test.

As a result, the electrode for an all-solid-state battery manufactured according to the Example was bent well, but the electrodes for an all-solid-state battery manufactured according to Comparative Example 1 and Comparative Example 2 became hard and cracked when bent.

In other words, the electrode sheet manufactured by the first rollers needs to satisfy the conditions such as the thickness ratio according to the present disclosure and the absolute value of the thickness of the electrode sheet. Also, the thickness ratio of the electrode sheet on the basis of the thickness of the electrode layer need to be satisfied so as to manufacture the thickened electrode for an all-solid-state-battery according to the present disclosure.

In other words, the method of manufacturing an electrode for an all-solid-state battery according to the present disclosure is performed in a dry manner, which is different from a conventional method that is performed in a wet manner. Thus, an electrode for an all-solid-state battery having an electrode layer with a desired thickness and a desired density of mixture material may be manufactured by adjusting the conditions of the first and the second rollers. In addition, the manufacturing speed may be accelerated, because there is no drying process, so that the efficiency of manufacturing is improved. In addition, in the method of manufacturing the electrode for an all-solid-state battery according to the present disclosure, situations such as swelling of a binder and so on do not occur, which is different from a conventional method that is performed in a wet manner, so that uniform thickening of the electrode may be realized. In addition, the electrode for an all-solid-state battery manufactured thereby may have an excellent porosity by adjusting the conditions of the second rollers.

What is claimed is:

1. A method of manufacturing an electrode for an all-solid-state battery, the method comprising:
    preparing a mixture for an electrode, the mixture including a solid electrolyte and an active material;
    manufacturing an electrode sheet by compressing the mixture for the electrode with a plurality of pairs of first rollers;
    manufacturing a composite sheet by providing a current collector sheet on the electrode sheet; and
    obtaining an electrode for an all-solid-state battery by compressing the composite sheet with at least one pair of second rollers,
    wherein a diameter of each of the second rollers is 4 to 10 times larger than a diameter of each of the first rollers, and the electrode for an all-solid-state battery comprises:
        a current collecting layer; and
        an electrode layer positioned on the current collecting layer,
    wherein the mixture for the electrode is in a form of clay,
    wherein a thickness ratio of the electrode sheet is 120% to 130% when a thickness of the electrode layer in the electrode for an all-solid-state battery is set to 100%,
    wherein the diameter of each of the first rollers is 1 cm to 5 cm, and
    wherein a distance between one pair of the first rollers and another pair of the first rollers adjacent to the one pair of the first rollers is 10 cm or less.

2. The method of claim 1, wherein a rolling rate of one of the pairs of first rollers is 10% to 30%, and
    wherein the rolling rate is a percentage of a reduced thickness of the mixture for the electrode after compression by the first rollers compared to a thickness of the mixture for the electrode before compression by the first rollers.

3. The method of claim 1, wherein a thickness of the electrode sheet is 150 µm to 500 µm.

4. The method of claim 1, wherein the diameter of each of the second rollers is 4 cm to 50 cm.

5. The method of claim 1, wherein a rolling rate of the second rollers is 15% to 30%, and
    wherein the rolling rate is a percentage of a reduced thickness of a material after compression by the second rollers compared to a thickness of the material before compression by the second rollers.

6. The method of claim 1, wherein a number of the second rollers is 1 pair to 2 pairs.

7. The method of claim 1, wherein a temperature of each of the first rollers and each of the second rollers is 150° C. or less.

* * * * *